United States Patent
Castillo et al.

(10) Patent No.: US 11,614,642 B2
(45) Date of Patent: Mar. 28, 2023

(54) PHASE CHANGE MATERIAL DISPLAY DEVICE

(71) Applicant: E INK CORPORATION, Billerica, MA (US)

(72) Inventors: Sergio Garcia Castillo, Oxford (GB); Peiman Hosseini, London (GB)

(73) Assignee: E Ink Corporation, Billerica, MA (US)

(*) Notice: Subject to any disclaimer, the term of this patent is extended or adjusted under 35 U.S.C. 154(b) by 10 days.

(21) Appl. No.: 16/972,385

(22) PCT Filed: May 22, 2019

(86) PCT No.: PCT/GB2019/051408
§ 371 (c)(1),
(2) Date: Dec. 4, 2020

(87) PCT Pub. No.: WO2019/239099
PCT Pub. Date: Dec. 19, 2019

(65) Prior Publication Data
US 2021/0231982 A1 Jul. 29, 2021

(30) Foreign Application Priority Data
Jun. 14, 2018 (GB) .................... 1809760

(51) Int. Cl.
*G02F 1/01* (2006.01)
*G09G 3/20* (2006.01)

(52) U.S. Cl.
CPC ......... *G02F 1/0147* (2013.01); *G09G 3/2003* (2013.01); *G02F 2203/05* (2013.01); *G09G 2300/08* (2013.01); *G09G 2310/02* (2013.01)

(58) Field of Classification Search
CPC ...... G02F 1/009; G02F 1/0147; G02F 1/0322; G02B 26/007; G02B 5/201; G09G 2300/08
See application file for complete search history.

(56) References Cited

U.S. PATENT DOCUMENTS 5,389,946 A 2/1995 Tuli
6,327,397 B1 * 12/2001 Schiaffino ............ G02B 6/3582
385/16

(Continued)

FOREIGN PATENT DOCUMENTS

DE 10330823 A1 1/2005
EP 3203309 A1 8/2017

(Continued)

OTHER PUBLICATIONS

Hosseini P, et al. An optoelectronic framework enabled by lowdimensional phase-change films. Nature. Jul. 10, 2014;511(7508):206-11.

(Continued)

*Primary Examiner* — Priyank J Shah
(74) *Attorney, Agent, or Firm* — Brian D. Bean

(57) ABSTRACT

The disclosure relates to displays. In one arrangement a plurality of pixels is provided in which each pixel comprises a phase change material thermally switchable between a plurality of stable states. Each pixel comprises a switching device configured to heat the phase change material, and thereby thermally switch the phase change material, in response to a control signal. The switching device comprises a single electronic component capable of being switched between different states by the control signal and configured such that heat received by the phase change material of the pixel during the thermal switching of the phase change material of the pixel consists predominantly of heat generated within the single electronic component.

22 Claims, 7 Drawing Sheets

(56) References Cited

U.S. PATENT DOCUMENTS

| | | | | |
|---|---|---|---|---|
| 10,437,083 B1* | 10/2019 | Baleine | ................ | G02F 1/0054 |
| 2015/0098032 A1* | 4/2015 | Park | ..................... | G02F 1/0147 |
| | | | | 349/21 |
| 2018/0017840 A1* | 1/2018 | Broughton | ............ | G02F 1/0311 |
| 2019/0069347 A1* | 2/2019 | Lee | ..................... | H05B 1/0227 |

FOREIGN PATENT DOCUMENTS

| | | |
|---|---|---|
| EP | 3299872 A1 | 3/2018 |
| EP | 3333618 A1 | 6/2018 |
| WO | 2015097468 A1 | 7/2015 |
| WO | 2015097469 A2 | 7/2015 |
| WO | 2017064509 A1 | 4/2017 |
| WO | 2018109427 A1 | 6/2018 |

OTHER PUBLICATIONS

International Searching Authority. International Search Report and Written Opinion for application PCT/GB2019/051408. dated Jul. 16, 2019. 13 pages.

* cited by examiner

PHASE CHANGE MATERIAL DISPLAY
DEVICE

CROSS-REFERENCE TO RELATED
APPLICATIONS

This application represents the national stage entry of PCT International Application No. PCT/GB2019/051408 filed on May 22, 2019, which claims the benefit of Great Britain Patent Application No. 1809760.0 filed on Jun. 14, 2018, the entire contents of which are incorporated herein by reference for all purposes.

The present invention relates to a display using phase change materials (PCMs).

It is known to use PCMs in high resolution reflective displays and see-through displays. PCMs are materials that can be switched by electrical, optical or thermal means between a plurality of phases having different optoelectronic properties. Bi-stable PCMs are particularly attractive because after a phase transition has been completed it is not necessary to continuously apply power to maintain the new state. PCM optoelectronic devices can dynamically change their optical properties by initiating phase transitions in the PCMs using rapid pulses of thermal energy. Pixels can be switched across micron scale areas to achieve high resolution display properties.

While the stability of PCM displays favours low energy consumption, energy losses still occur during the switching process.

It is an object of the invention to provide a PCM display with a lower power consumption and/or simpler construction.

According to an aspect of the invention, there is provided a display comprising: a plurality of pixels, wherein: each pixel comprises a phase change material element comprising a phase change material thermally switchable between a plurality of stable states having different refractive indices relative to each other; each pixel comprises a switching device configured to heat the phase change material of the pixel, and thereby thermally switch the phase change material of the pixel, in response to a control signal received by the switching device; and the switching device comprises a single electronic component capable of being switched between different states by the control signal and configured such that heat received by the phase change material of the pixel during the thermal switching of the phase change material of the pixel consists predominantly of heat generated within the single electronic component.

Thus, a display is provided in which a single electronic component in each pixel intrinsically performs the dual role of changing state in response to a control signal and generating the heat needed to switch the PCM of the pixel. In comparison to alternative approaches that use a separate resistive heating element, this embodiment achieves significantly lower power consumption and/or can simplify construction and/or improve compactness.

In an embodiment, a metallic heat sink structure is provided between the single electronic component and the PCM element. The metallic heat sink structure directs heat generated in the single electronic component efficiently towards the PCM element, allowing rapid, reliable switching and/or further contributing to low overall power consumption.

Embodiments of the disclosure may be applied particularly, but not exclusively, to "seamless" displays, in which an optically opaque layer such as a reflector is positioned between the switching devices and the switchable PCM elements (thereby hiding the switching devices from view in use), with the heating provided by the switching devices constituting a signal passing through the optically opaque layer to the PCM elements.

The invention will now be further described, by way of example, with reference to the accompanying drawings, in which:

FIG. 1 schematically depicts driving electronics for a portion of a display comprising a plurality of pixels;

Throughout this specification, the terms "optical" and "light" are used, because they are the usual terms in the art relating to electromagnetic radiation, but it is understood that in the context of the present specification they are not limited to visible light. It is envisaged that the invention can also be used with wavelengths outside of the visible spectrum, such as with infrared and ultraviolet light.

Figure 1:
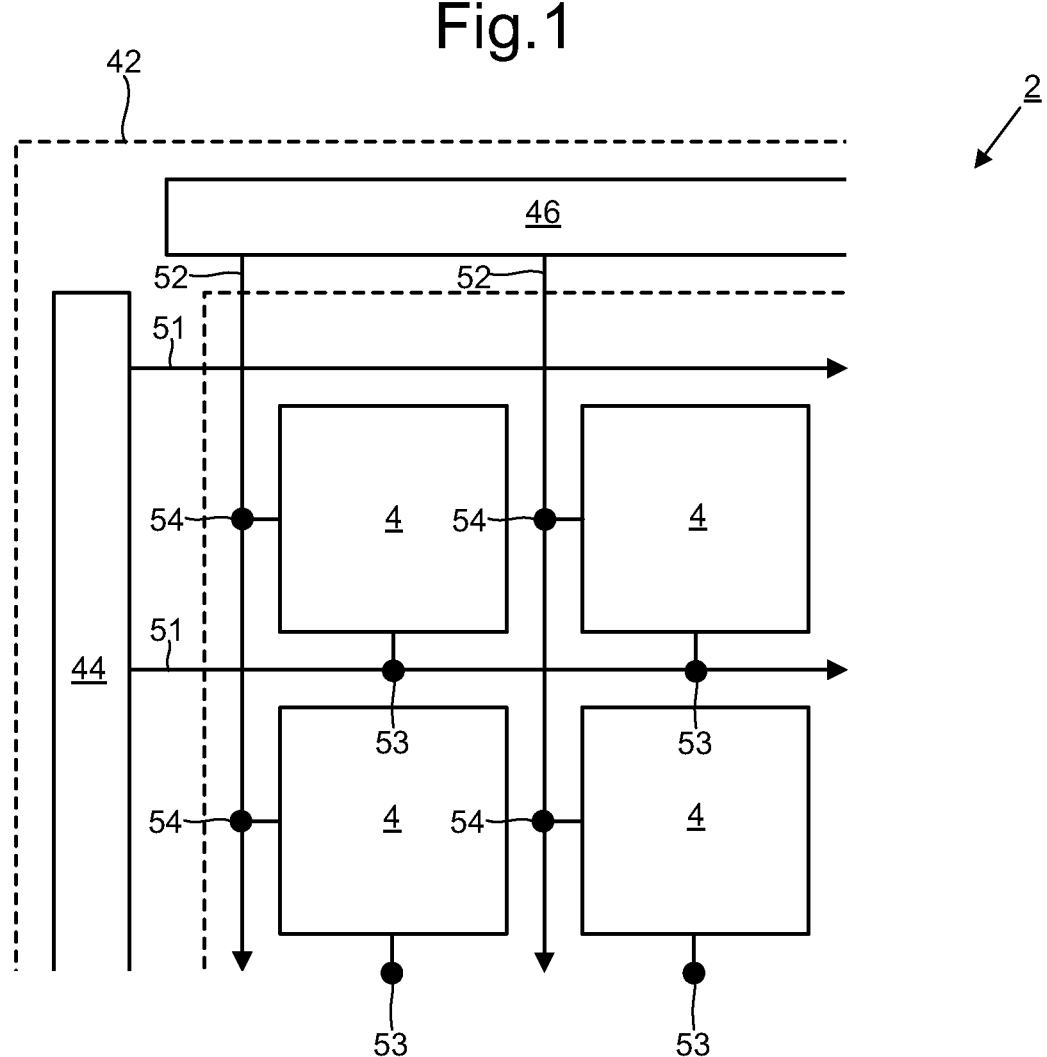
Figure 4:
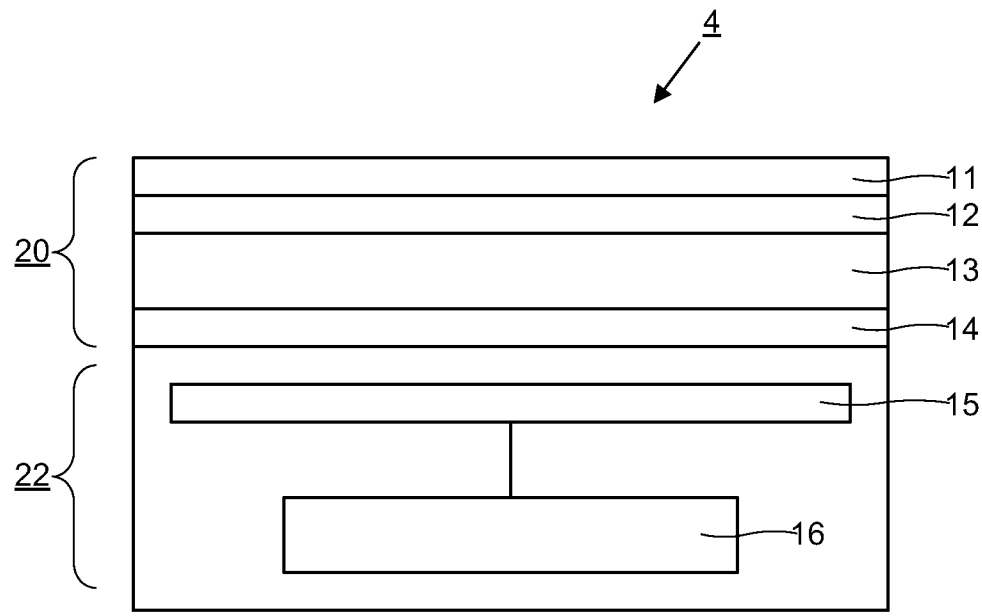
FIG. 4 is a schematic side sectional view of a pixel.
Figure 6:
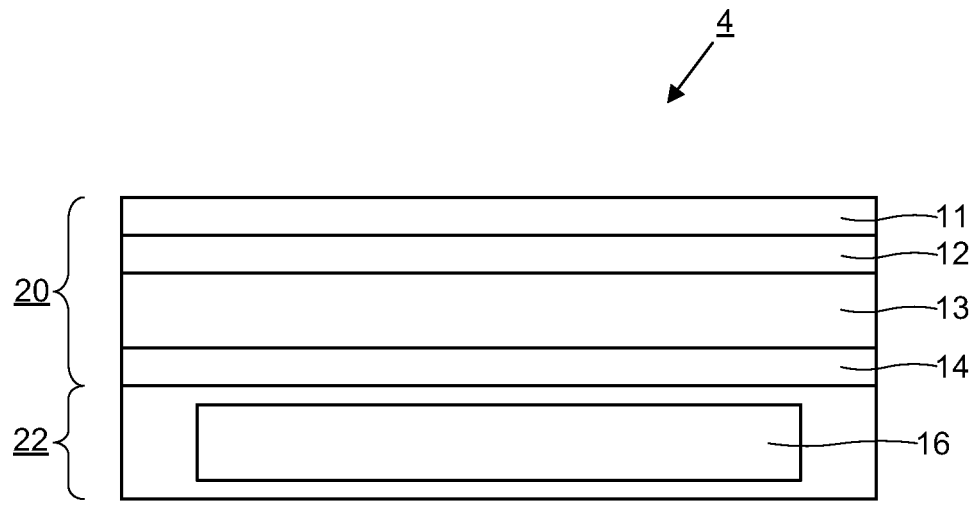
FIG. 6 is a schematic side sectional view of a pixel according to an embodiment.

FIG. 1 depict driving electronics 2 for a portion of a display. The display comprises a plurality of pixels 4. Four example pixels 4 in a top left corner of the display are depicted in FIG. 1. Each pixel 4 comprises a stack 20 of layers that comprises a PCM element 12 (example stacks 20 are shown in FIGS. 4 and 6 and described in further detail below). The PCM element 12 comprises a PCM reversibly switchable between a plurality of stable states having different refractive indices relative to each other. In an embodiment, the PCM element 12 of each pixel 4 controls the colour of the pixel 4. The PCM element 12 is switchable between a set of optical states comprising at least two optical states which cause the pixel 4 to have different colours. In an embodiment, the different colours include red and white, blue and white, or green and white.

Further optical elements may optionally be provided, such as optical elements that control the overall intensity of the pixels 4 (e.g. to control grey scale levels). Each further optical element may, for example, comprise a liquid crystal display (LCD) element, comprising for example one or more of the following: an LCD with polarizer, a polarizer-free LCD, a dye-doped LCD. Alternatively or additionally, the further optical elements may comprise an electrowetting optical element or a MEMS element. Any other optical element providing the desired optical properties (e.g. grey scale control) may be used.

As depicted in FIGS. 4 and 6, each pixel 4 comprises a stack 20 of layers. The stack 20 comprises a PCM element 12. The PCM element 12 may be provided as a continuous layer of PCM spanning across multiple pixels 4 or a separate unit of PCM may be provided for each pixel 4. Each pixel 4 comprises a portion of PCM (forming the PCM element 12 of that pixel 4) that is thermally switchable at least predominantly independently of the portion of PCM of any of the other pixels 4 (although there may be some cross-talk between pixels 4 where heating intended to switch the PCM element 12 of one pixel 4 also causes a degree of heating in the PCM element 12 of a neighbouring pixel 4).

The PCM in each pixel 4 is switchable between a plurality of stable states having different refractive indices relative to each other. In an embodiment, the switching is reversible. Each stable state has a different refractive index (optionally including a different imaginary component of the refractive index, and thereby a different absorbance) relative to each of the other stable states. In an embodiment all layers in each stack 20 are solid-state and configured so that their thicknesses as well as refractive index and absorption properties combine so that the different states of the PCM result in different, visibly and/or measurably distinct, reflection spectra. Optical devices of this type are described in Nature 511, 206-211 (10 Jul. 2014), WO2015/097468A1, WO2015/097469A1, EP3203309A1 and PCT/GB2016/053196.

In an embodiment the PCM comprises, consists essentially of, or consists of, one or more of the following: an oxide of vanadium (which may also be referred to as VOx); an oxide of niobium (which may also be referred to as NbOx); an alloy or compound comprising Ge, Sb, and Te; an alloy or compound comprising Ge and Te; an alloy or compound comprising Ge and Sb; an alloy or compound comprising Ga and Sb; an alloy or compound comprising Ag, In, Sb, and Te; an alloy or compound comprising In and Sb; an alloy or compound comprising In, Sb, and Te; an alloy or compound comprising In and Se; an alloy or compound comprising Sb and Te; an alloy or compound comprising Te, Ge, Sb, and S; an alloy or compound comprising Ag, Sb, and Se; an alloy or compound comprising Sb and Se; an alloy or compound comprising Ge, Sb, Mn, and Sn; an alloy or compound comprising Ag, Sb, and Te; an alloy or compound comprising Au, Sb, and Te; and an alloy or compound comprising Al and Sb (including the following compounds/alloys in any stable stoichiometry: GeSbTe, VOx, NbOx, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb). Preferably, the PCM comprises one of $Ge_2Sb_2Te_5$ and $Ag_3In_4Sb_{76}Te_{17}$. It is also understood that various stoichiometric forms of these materials are possible: for example $Ge_xSb_yTe_z$; and another suitable material is $Ag_3In_4Sb_{76}Te_{17}$ (also known as AIST). Furthermore, any of the above materials can comprise one or more dopants, such as C or N. Other materials may be used.

PCMs are known that undergo a drastic change in both the real and imaginary refractive index when switched between amorphous and crystalline phases. The switching can be achieved for example by heating induced by suitable electric pulses or by a light pulse from a laser light source, or, as in embodiments described below, by thermal conduction of heat generated by a switching device in thermal contact with the PCM. There is a substantial change in the refractive index when the material is switched between amorphous and crystalline phases. The material is stable in either state. Switching can be performed an effectively limitless number of times. However, it is not essential that the switching is reversible.

Although some embodiments described herein mention that the PCM is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

In an embodiment, the PCM comprises $Ge_2Sb_2Te_5$ (GST) in a layer less than 200 nm thick. In another embodiment, the PCM comprises GeTe (not necessarily in an alloy of equal proportions) in a layer less than 100 nm thick.

Figure 2:
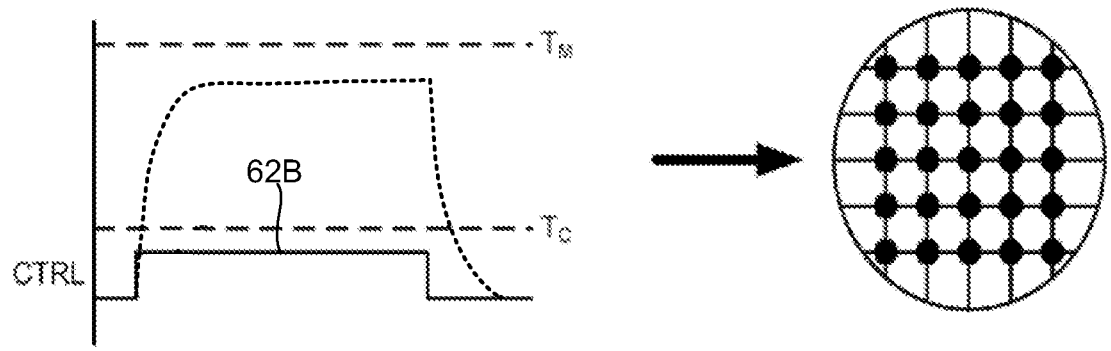
FIG. 2 depicts a heater control cycle (left) for switching an example PCM element into a crystalline state (depicted schematically on the right)
Figure 3:
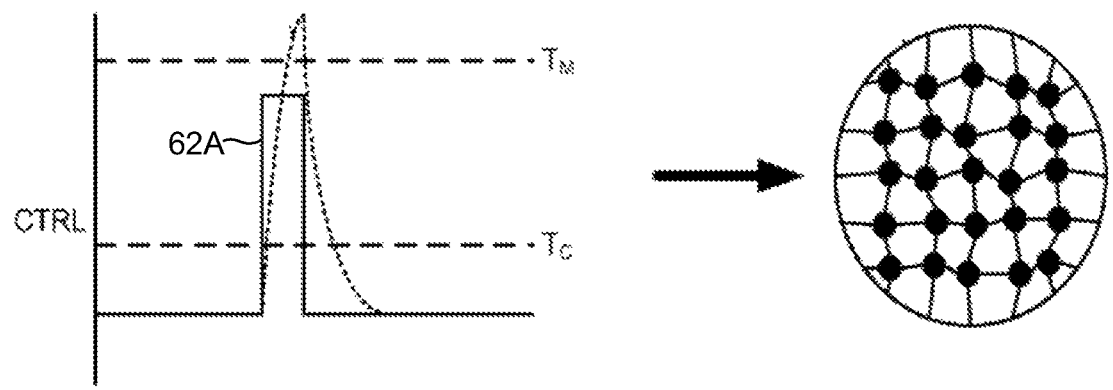
FIG. 3 depicts a heater control cycle (left) for switching an example PCM element into an amorphous state (depicted schematically on the right)

A plurality of switching devices 22 are provided for selectively actuating each of the PCM elements 12 as desired. Each switching device 22 selectively heats the PCM of the selected PCM element 12 to perform the thermal switching. Examples of thermal heating profiles (temperature against time) suitable for example switches (amorphous to crystalline and crystalline to amorphous) are shown in FIGS. 2 and 3. Here, a switching device 22 is driven by a control signal CTRL. The control signal CTRL in this example comprises a current pulse of one of two predefined types, each different type of pulse being suitable for generating a variation of temperature with time (a heating profile) that is suitable for a different type of switching.

In FIG. 2 the control signal CTRL (solid line) comprises a pulse of relatively low amplitude and long duration. The pulse provides a first heating profile (dotted line) effective for switching the PCM to a crystalline state (shown on the right). The first heating profile is such that the PCM is heated to a temperature higher than the crystallization temperature $T_C$ of the PCM, but less than the melting temperature $T_M$ of the PCM. The temperature is maintained above the crystallization temperature $T_C$ for a time sufficient to crystallize the PCM.

In FIG. 3 the control signal CTRL (solid line) comprises a pulse of higher amplitude but shorter duration. The pulse provides a second heating profile (dotted line) effective for switching the PCM to an amorphous state (shown on the right). The second heating profile is such that the PCM is heated to a temperature that is higher than the melting temperature $T_M$, causing melting of the PCM, but is cooled sufficiently quickly that re-crystallization does not occur excessively and the PCM freezes into an amorphous state.

As demonstrated in the example of FIGS. 2 and 3, after the heating of the PCM has finished the PCM remains in the stable state selected (e.g. amorphous or crystalline) until further heating is applied. Thus, when based on PCM the pixel 4 is naturally held in a given optical state without application of any signal, and can thus operate with significantly less power than other display technologies. Switching can be performed an effectively limitless number of times.

The switching speed is also very rapid, typically less than 300 ns, and certainly several orders faster than the human eye can perceive.

In an embodiment, the stack 20 of each pixel 4 comprises a reflective layer 14. The reflective layer 14 may span across multiple pixels 4. The reflective layer 14 may be made highly reflective or only partially reflective. The reflective layer 14 may be omitted. In an embodiment, the reflective layer 14 comprises reflective material such as a metal. Metals are known to provide good reflectivity (when sufficiently thick) and also have high thermal and electrical conductivities. The reflective layer 14 may have a reflectance of 50% or more, optionally 90% or more, optionally 99% or more, with respect to visible light, infrared light, and/or ultraviolet light. The reflective layer 14 may comprise a thin metal film, composed for example of Au, Ag, Al, or Pt. If this layer is to be partially reflective then a thickness in the range of 5 to 15 nm might be selected, otherwise the layer is made thicker, such as 100 nm, to be substantially totally reflective.

In an embodiment, the stack 20 of each pixel 4 further comprises a spacer layer 13. The spacer layer 13 is between the PCM element 12 and the reflective layer 14.

In an embodiment, the stack 20 of each pixel 4 further comprises a capping layer 11. The PCM element 12 is between the capping layer 11 and the reflective layer 14. The upper surface of the capping layer 11 may face towards a viewing side of the apparatus, and the reflective layer 14 may act as a back-reflector when required as a mirror. Light enters and leaves through the viewing surface (from above in FIGS. 4 and 6). However, because of interference effects which are dependent on the refractive index of the PCM and the thickness of the spacer layer 13, the reflectivity varies significantly as a function of wavelength. The spacer layer 13 and the capping layer 11 are both optically transmissive, and are ideally as transparent as possible.

Each of the capping layer 11 and spacer layer 13 may consist of a single layer or comprise multiple layers having different refractive indices relative to each other (i.e. where the capping layer 11 or spacer layer 13 consists of multiple layers at least two of those layers have different refractive indices relative to each other). The thickness and refractive index of the material or materials forming the capping layer 11 and/or spacer layer 13 are chosen to create a desired spectral response (via interference and/or absorption). Materials which may be used to form the capping layer 11 and/or spacer layer 13 may include (but are not limited to) ZnO, $TiO_2$, $SiO_2$, $Si_3N_4$, TaO, ITO, and $ZnS$—$SiO_2$.

In an embodiment, the stack 20 further comprises a barrier layer (not shown) between the switching device 22 and the layers of the stack 20 (above the switching device 22). In an embodiment, the barrier layer is an electrical insulator that is thermally conductive such that the barrier layer electrically insulates the switching device 22 from the PCM, but allows heat from the switching device 22 to pass through the barrier layer to the PCM to change the state of the PCM, for example to a crystallized state in response to a first heating profile and to an amorphous state in response to a second heating profile. In example embodiments the barrier layer comprises one or more of the following: SiN, AlN, $SiO_2$, silicon carbide (SiC), and diamond (C).

Any or all of the layers in each pixel 4 may be formed by sputtering, which can be performed at a relatively low temperature of 100 degrees C. The layers can also be patterned using conventional techniques known from lithography, or other techniques e.g. from printing. Additional layers may also be provided for the device as necessary.

In a particular embodiment, the PCM element 12 comprises GST, is less than 100 nm thick, and preferably less than 10 nm thick, such as 6 or 7 nm thick. The spacer layer 13 is grown to have a thickness typically in the range from 10 nm to 250 nm, depending on the colour and optical properties required. The capping layer 11 is, for example, 20 nm thick.

Example driving electronics 2 are shown schematically in FIG. 1. A driving controller 42 comprises a row driver 44 and a column driver 46. The row driver 44 and column driver 46 provide driving signals to the pixels 4 via row signal lines 51 and column signal lines 52. The row signal lines 51 connect to each pixel 4 via a row connection 53 corresponding to the pixel 4. The column signal lines 52 connect to each pixel 4 via a column connection 54 corresponding to the pixel 4. The row and column signal lines 51,52 allow individual addressing of each pixel 4 by applying a combination of a row control signal and a column control signal to the pixel 4 via the row connection 53 and the column connection 54 corresponding to the pixel 4.

Each pixel 4 comprises a switching device 22. The switching device 22 applies a heating profile (e.g. as depicted in FIGS. 2 and 3 and discussed above) to the PCM element 12 of the pixel 4 in response to a control signal received by the switching device 22 (e.g. via row and column signal lines 51, 52, as depicted in FIG. 1).

Figure 5:
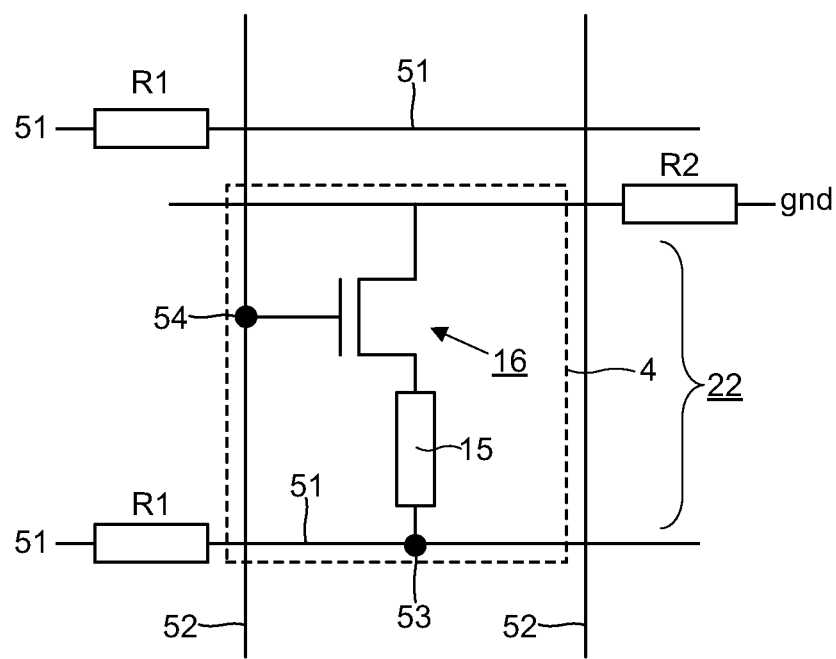
FIG. 5 depicts circuitry for switching the pixel of FIG. 4, including a semiconductor device that applies heating to a phase change material (PCM) element by passing a current through a resistive heating element outside of the semiconductor device.

In the arrangement shown in FIG. 4, the switching device 22 comprises a resistive heating element 15. The resistive heating element 15 may for example comprise a metal or metal alloy material, or a non-metallic or metal oxide (e.g. ITO) material. FIG. 5 depicts example circuitry for driving the pixel 4 shown in FIG. 4. A thin film transistor (TFT) 16 operates as a switch and selectively drives an electrical current through the resistive heating element 15 when the pixel 4 is addressed via the respective row and column signal lines 51, 52. The switching device 22 in this example thus comprises two elements: the TFT 16 and the resistive heating element 15.

The inventors have found that significant heating is generated within the TFT 16 during operation of arrangements of the type depicted in FIGS. 4 and 5. This heating does not contribute optimally to switching of the PCM element 12 in the pixel 4, which is achieved predominantly via Joule heating within the separate resistive heating element 15. Much of the heat generated in the TFT 16 is simply lost. The inventors have recognised that this energy could instead be used directly to switch (or help switch) the PCM. In embodiments described below, this recognition is exploited to provide arrangements that can implement switching more efficiently (using less power overall) and/or using a simpler and/or more compact structure.

Figure 7:
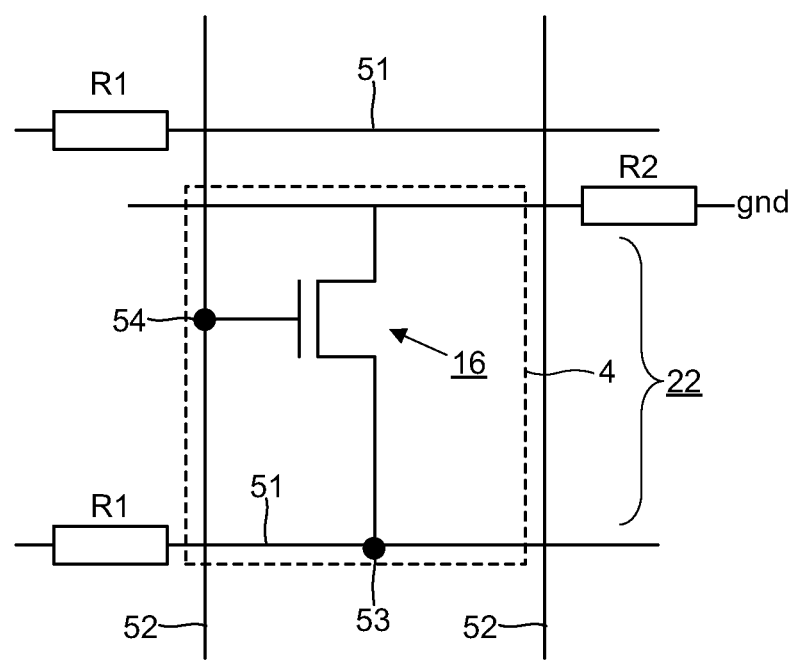
FIG. 7 depicts circuitry for switching the pixel of FIG. 6, including a semiconductor device that applies heating to a PCM element directly, without use of a resistive heating element outside of the semiconductor device.

FIGS. 6 and 7 depict a pixel 4 of an example embodiment. The pixel 4 comprises a switching device 22. The switching device 22 comprises a single electronic component 16 capable of being switched between different states by a control signal (e.g. between an ON state and an OFF state, the ON state being a state in which an electrical current can flow through the single electronic component more easily than in the OFF state, in the manner of a switch). The single electronic component 16 is configured such that heat received by the PCM element 12 during thermal switching (e.g. while the row control signal and the column control signal are addressing the pixel 4) consists predominantly of heat generated within the single electronic component 16 and conducted to the PCM element 12 from the single electronic component 16. Each pixel 4 is configured such that more heat is generated within the single electronic component 16 than elsewhere within the pixel 4 during the thermal switching of the PCM. The structure of FIGS. 6 and 7 thus differs from the structure of FIGS. 4 and 5 in that the switching device 22 does not comprise any separate resistive heating element 15. Instead, the switching functionality and the required heating is provided internally within one and the same single electronic component 16 (a TFT in the example shown). Thus, maximal use is made of the heat that will inevitably be generated within an electronic component used for switching in response to a control signal. Better use of power is thus achieved than in arrangements of the type depicted in FIGS. 4 and 5. Removing the need for a separate resistive heating element 15 also makes the overall structure of the pixel 4 simpler and easier to fabricate, as well as being more compact in the vertical direction.

In an embodiment, a first terminal (e.g. a source or drain terminal) of the single electronic component 16 is connected directly (i.e. not via any other electronic component, such as a resistor) to one of the row signal lines 51 and a second terminal (e.g. a gate terminal) of the single electronic component 16 is connected directly (i.e. not via any other electronic component, such as a resistor) to one of the column signal lines 52. In the particular example of FIG. 7, first and second terminals (respectively source and gate) of the single electronic component 16 are connected directly to the row and column signal lines 51 and 52 at points 53 and 54 respectively. In FIG. 5, in contrast, there is a direct connection between the TFT 16 and the column signal line 52 at point 54 but no direct connection between the TFT 16 and the row signal line 51 at point 53 (connection is made instead through the resistive heating element 15).

The single electronic component 16 may take various forms.

In one class of embodiments, the single electronic component 16 consists of a semiconductor device. In an embodiment, the semiconductor device consists of an active switch. In an embodiment, the semiconductor device consists of a TFT (as in the example of FIG. 7).

Heating power generated within a TFT is equal to the ON resistance of the TFT multiplied by the square of the current passing through the TFT. Heat is generated predominantly within the channel of the TFT. The resistance of the channel can be controlled by varying mobility and dimensions as desired using well known techniques in the field. In a non-limiting example, a power point for driving a transition in the PCM element 12 may be about 400 mW for transition to the amorphous state (corresponding to the height of the CTRL pulse in FIG. 2) and about 200 mW for transition to the crystalline state (corresponding to the height of the CTRL pulse in FIG. 3). Using an approach of the type depicted in FIGS. 4 and 5, with an n-type TFT having an ON resistance when in saturation of 200 Ohms and a resistive heating element 15 of 200 Ohms also (for maximum power transfer), the power dissipated in the TFT 16 and resistive heating element 15 would be about the same (about 400 mW each for the amorphous transition, using V=18V and I=45 mA, and about 200 mW each for the crystalline transition, using V=12.65V and I=31.6 mA, totalling 800 mW and 400 mW respectively). In the approach of FIGS. 4 and 5, the 400 mW or 200 mW need only be generated in the TFT, thereby effectively halving the power requirements of each pixel 4. In lower power implementations (e.g. with 40 mW for the amorphous transition and 20 mW for the crystalline transition) the situation would be similar, with the same 50% saving in overall power requirements.

Figure 8:
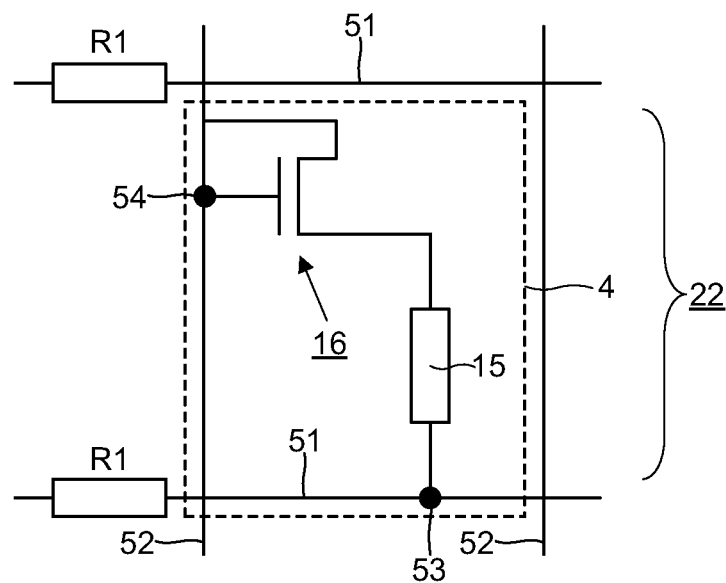
FIG. 8 depicts a variation on the circuitry of FIG. 5 in which a semiconductor device configured to operate as a diode is used to apply heating to a PCM element by passing a current through a resistive heating element outside of the semiconductor device.
Figure 9:
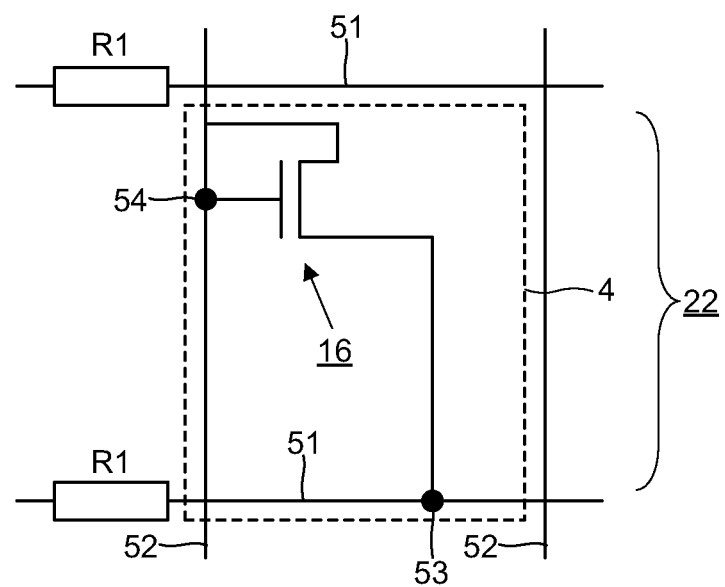
FIG. 9 depicts a variation on the circuitry of FIG. 7 in which a semiconductor device configured to operate as a diode is used to apply heating to a PCM element directly, without use of a resistive heating element outside of the semiconductor device.

FIG. 9 depicts an alternative embodiment in which the single electronic component 16 consists of a diode. The diode may be implemented using a dual terminal TFT, for example by self-biasing a three terminal TFT (e.g. by connecting drain and gate). The created diode-connected TFT has rectifying characteristics like a standard diode but also has an impedance that can be selected depending on mobility and W/L ratios. The leakage current is as low as a TFT and the rectification ratio could be made extremely large compared to a threshold selector (discussed below). FIG. 8 depicts a contrasting arrangement using a separate resistive heating element 15 for comparison purposes.

Figure 10:
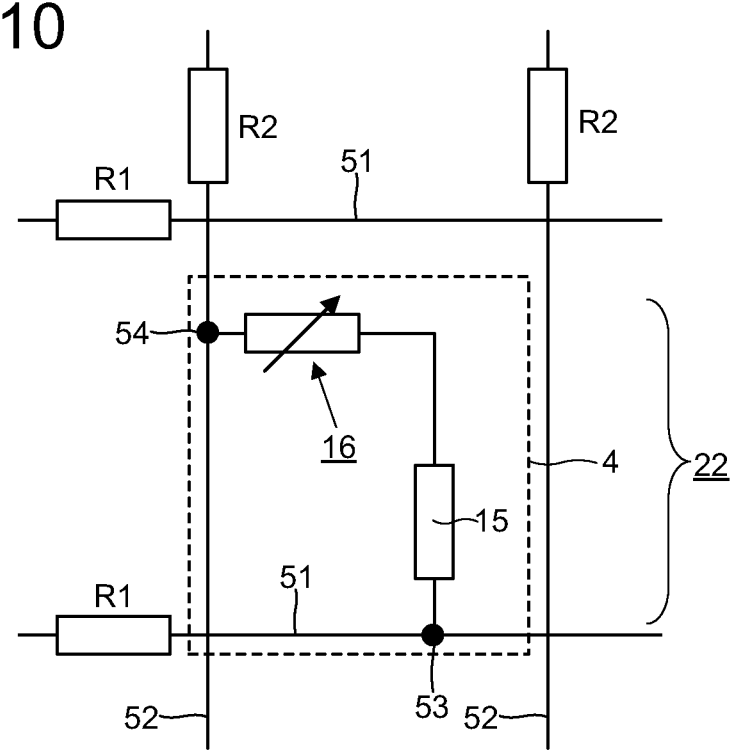
FIG. 10 depicts a variation on the circuitry of FIGS. 5 and 8 in which a threshold selector is used to apply heating to a PCM element by passing a current through a resistive heating element outside of the threshold selector.
Figure 11:
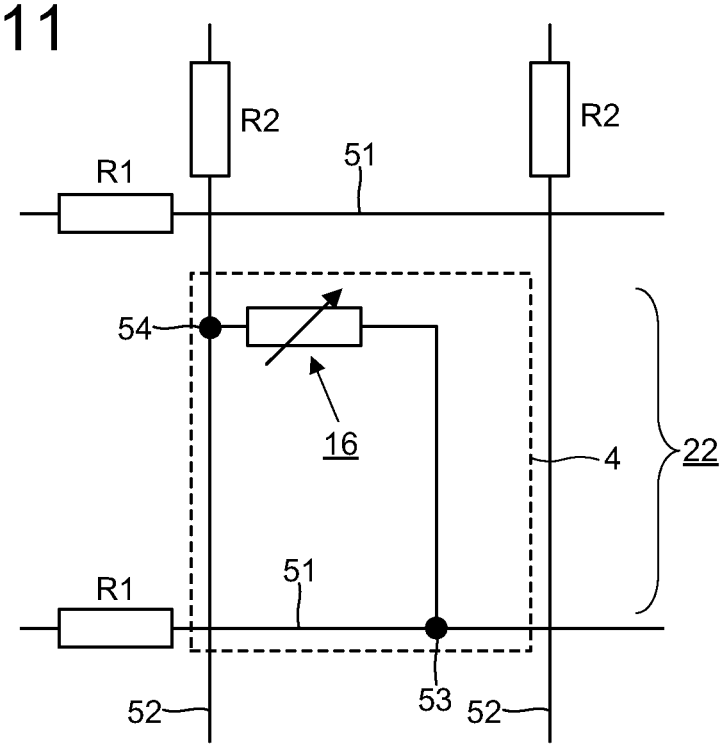
FIG. 11 depicts a variation on the circuitry of FIGS. 7 and 9 in which a threshold selector is used to apply heating profile to a PCM element directly, without use of a resistive heating element outside of the threshold selector.

FIG. 11 depicts an alternative embodiment in which the single electronic component 16 comprises a threshold selector comprising a threshold material having an electrical resistance that changes when a threshold current is passed through the threshold material. In this embodiment, the change in electrical resistance is an example of a change in state of the single electronic component 16 that can be initiated by the control signal. In an embodiment, the threshold material comprises a metal insulator transition (MIT) material. The power dissipated in the threshold material is equal to the conductive state resistance of the threshold material multiplied by the square of the current that passes through. Example threshold materials that show a change in resistance when a threshold current is passed through include niobium oxide, vanadium oxide, and titanium oxide. FIG. 10 depicts a contrasting arrangement using a separate resistive heating element 15 for comparison purposes.

In one class of embodiments, ON/OFF ratios for the threshold selector are in the range from 10/1 to 20/1, for example 10 k Ohms in high impedance state and 500 Ohm in low impedance state. The threshold selector changes its impedance as current flows through and joule heating is generated. The heating can then be used to switch the PCM element 12.

In a typical implementation of the type depicted in FIG. 10, a resistance of the resistive heating element 15 would be made equal to the low-impedance value of the threshold selector. As with the arrangements of FIGS. 5 and 8 discussed above, this causes the overall power to be twice as much as needed. By using the threshold selector itself as the heater, arrangements of the type depicted in FIG. 11 make it possible to save half the power.

Figure 12:
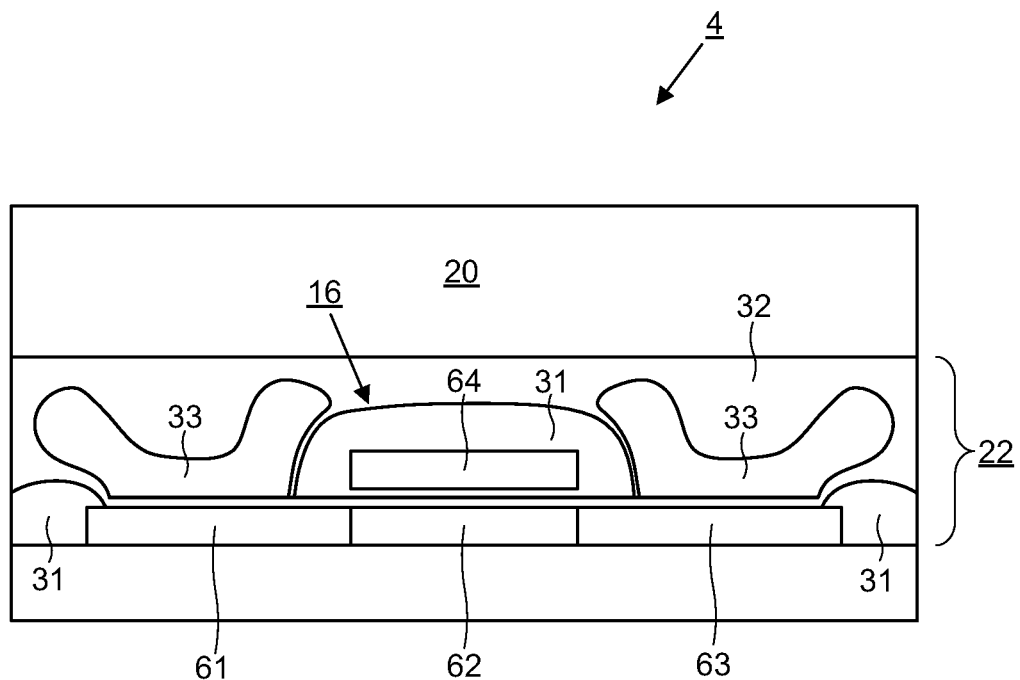
FIG. 12 is a schematic side sectional view of a pixel comprising a metallic heat sink structure.

FIG. 12 is a side sectional view of a pixel 4 having a metallic heat sink structure 33 to direct heat from the single electronic component 16 to the PCM element (in stack 20). In the particular example shown, the single electronic component 16 comprises a TFT formed on a substrate. In an embodiment, the substrate is configured to have low thermal conductivity, thereby reducing loss of heat in directions away from the PCM element 12. The substrate may comprise polyimide (PI) for example. The TFT comprises a source 61, channel 62, drain 63 and gate 64. A metallic heat sink structure 33 is provided between the single electronic component 16 and the PCM element (in stack 20). In the example shown, the metallic heat sink structure 33 is provided in thermal contact with the source 61 and drain 63. An oxide layer 31 is provided and the metallic heat sink structure 33 is embedded within an electrically insulating planarizing layer 32. The metallic heat sink structure 33 improves the efficiency with which heat is conducted from the single electronic component 16 to the PCM, thereby avoiding loss of heat energy and promoting rapid, efficient and/or reliable switching.

The invention claimed is:
1. A display comprising:
    a plurality of pixels, wherein:

each pixel comprises a phase change material element comprising a phase change material thermally switchable between a plurality of stable states having different refractive indices relative to each other;

each pixel comprises a switching device configured to heat the phase change material of the pixel, and thereby thermally switch the phase change material of the pixel, in response to a control signal received by the switching device;

the switching device comprises a single electronic component capable of being switched between different states by the control signal and configured such that heat received by the phase change material of the pixel during the thermal switching of the phase change material of the pixel consists predominantly of heat generated within the single electronic component;

wherein the display further comprises row signal lines and column signal lines configured to allow individual addressing of each pixel by applying a combination of a row control signal to the pixel, via the row signal line corresponding to the pixel, and a column control signal to the pixel, via a column signal line corresponding to the pixel, and wherein a first terminal of the single electronic component is connected directly to one of the row signal lines and a second terminal of the single electronic component is connected directly to one of the column signal lines.

2. The display of claim 1, wherein each pixel is configured such that more heat is generated within the single electronic component than elsewhere within the pixel during the thermal switching of the phase change material.

3. The display of claim 1, wherein the phase change material comprises one or more of the following:
 an oxide of vanadium;
 an oxide of niobium;
 an alloy or compound comprising Ge, Sb, and Te;
 an alloy or compound comprising Ge and Te;
 an alloy or compound comprising Ge and Sb;
 an alloy or compound comprising Ga and Sb;
 an alloy or compound comprising Ag, In, Sb, and Te;
 an alloy or compound comprising In and Sb;
 an alloy or compound comprising In, Sb, and Te;
 an alloy or compound comprising In and Se;
 an alloy or compound comprising Sb and Te;
 an alloy or compound comprising Te, Ge, Sb, and S;
 an alloy or compound comprising Ag, Sb, and Se;
 an alloy or compound comprising Sb and Se;
 an alloy or compound comprising Ge, Sb, Mn, and Sn;
 an alloy or compound comprising Ag, Sb, and Te;
 an alloy or compound comprising Au, Sb, and Te; and
 an alloy or compound comprising Al and Sb.

4. The display of claim 1, wherein each pixel comprises a stack of layers comprising a spacer layer provided between the phase change material element and a reflective layer, wherein the spacer layer consists of a single layer or comprises multiple layers of materials having different refractive indices.

5. The display of claim 1, wherein each pixel comprises a stack of layers comprising a capping layer, wherein the phase change material element is provided between the capping layer and a reflective layer and the capping layer consists of a single layer or comprises multiple layers of materials having different refractive indices.

6. A display comprising:
 a plurality of pixels, wherein:
 each pixel comprises a phase change material element comprising a phase change material thermally switchable between a plurality of stable states having different refractive indices relative to each other;

each pixel comprises a switching device configured to heat the phase change material of the pixel, and thereby thermally switch the phase change material of the pixel, in response to a control signal received by the switching device; and the switching device comprises a single electronic component consisting of a semiconductor device capable of being switched between different states by the control signal and configured such that heat received by the phase change material of the pixel during the thermal switching of the phase change material of the pixel consists predominantly of heat generated within the single electronic component.

7. The display of claim 6, wherein the semiconductor device consists of an active switch.

8. The display of claim 6, wherein the semiconductor device comprises a thin film transistor.

9. The display of claim 8, wherein the thin film transistor is configured to operate as a diode.

10. The display of claim 6, wherein the heat generated within the semiconductor device during the thermal switching of the phase change material is generated predominantly within the channel of the thin film transistor.

11. The display of claim 6, wherein each pixel is configured such that more heat is generated within the single electronic component than elsewhere within the pixel during the thermal switching of the phase change material.

12. The display of claim 6, wherein each pixel comprises a stack of layers comprising a spacer layer provided between the phase change material element and a reflective layer, wherein the spacer layer consists of a single layer or comprises multiple layers of materials having different refractive indices.

13. The display of claim 6, wherein each pixel comprises a stack of layers comprising a capping layer, wherein the phase change material element is provided between the capping layer and a reflective layer and the capping layer consists of a single layer or comprises multiple layers of materials having different refractive indices.

14. A display comprising:
 a plurality of pixels, wherein:
 each pixel comprises a phase change material element comprising a phase change material thermally switchable between a plurality of stable states having different refractive indices relative to each other;

each pixel comprises a switching device configured to heat the phase change material of the pixel, and thereby thermally switch the phase change material of the pixel, in response to a control signal received by the switching device; and the switching device comprises a single electronic component consisting of a threshold selector comprising a threshold material comprising a metal insulator transition material and having an electrical resistance that changes when a threshold current is passed through the threshold material, the single electronic component capable of being switched between different states by the control signal and configured such that heat received by the phase change material of the pixel during the thermal switching of the phase change material of the pixel consists predominantly of heat generated within the single electronic component.

15. The display of claim 14, wherein each pixel is configured such that more heat is generated within the single electronic component than elsewhere within the pixel during the thermal switching of the phase change material.

16. The display of claim 14, wherein each pixel comprises a stack of layers comprising a spacer layer provided between the phase change material element and a reflective layer, wherein the spacer layer consists of a single layer or comprises multiple layers of materials having different refractive indices.

17. The display of claim 14, wherein each pixel comprises a stack of layers comprising a capping layer, wherein the phase change material element is provided between the capping layer and a reflective layer and the capping layer consists of a single layer or comprises multiple layers of materials having different refractive indices.

18. A display comprising:
a plurality of pixels, wherein:
each pixel comprises a phase change material element comprising a phase change material thermally switchable between a plurality of stable states having different refractive indices relative to each other;
each pixel comprises a switching device configured to heat the phase change material of the pixel, and thereby thermally switch the phase change material of the pixel, in response to a control signal received by the switching device;
the switching device comprises a single electronic component capable of being switched between different states by the control signal and configured such that heat received by the phase change material of the pixel during the thermal switching of the phase change material of the pixel consists predominantly of heat generated within the single electronic component; and
a metallic heat sink structure between the single electronic component and the phase change material element, the metallic heat sink structure being embedded within a planarizing layer.

19. The display of claim 18, wherein the planarizing layer is electrically insulating.

20. The display of claim 18, wherein each pixel is configured such that more heat is generated within the single electronic component than elsewhere within the pixel during the thermal switching of the phase change material.

21. The display of claim 18, wherein each pixel comprises a stack of layers comprising a spacer layer provided between the phase change material element and a reflective layer, wherein the spacer layer consists of a single layer or comprises multiple layers of materials having different refractive indices.

22. The display of claim 18, wherein each pixel comprises a stack of layers comprising a capping layer, wherein the phase change material element is provided between the capping layer and a reflective layer and the capping layer consists of a single layer or comprises multiple layers of materials having different refractive indices.

* * * * *